April 4, 1967     E. KAHN ETAL     3,312,242
DAMPER CONSTRUCTION
Filed June 11, 1964
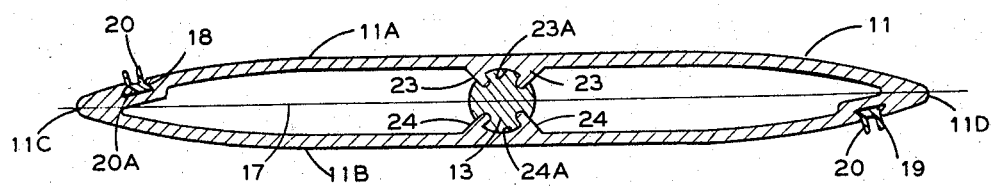
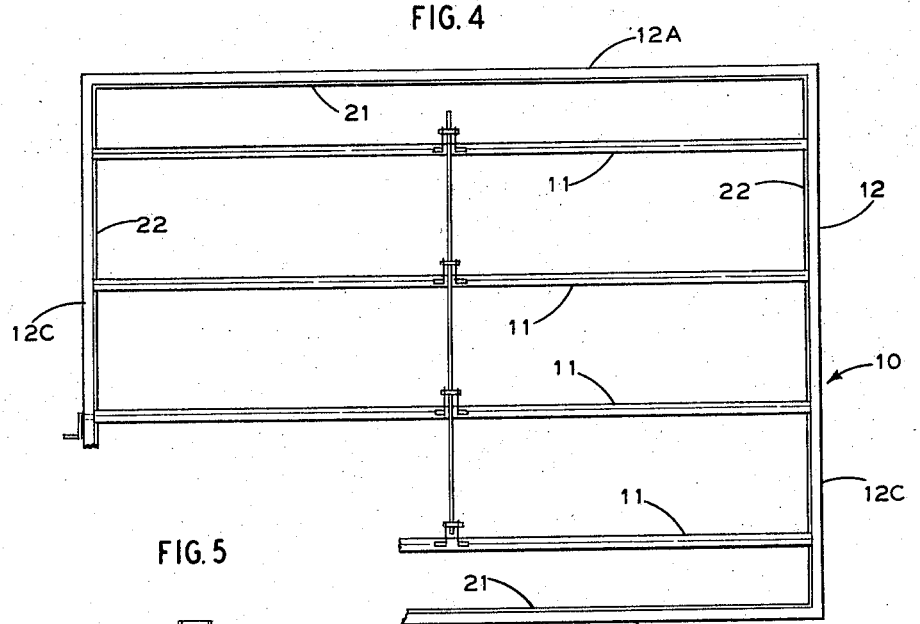
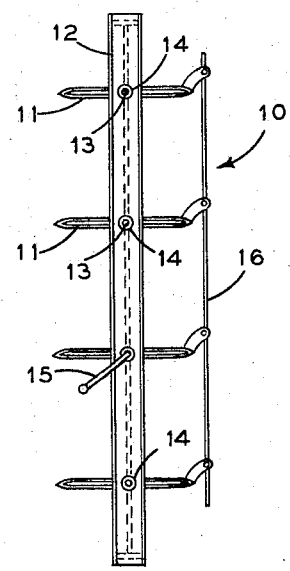
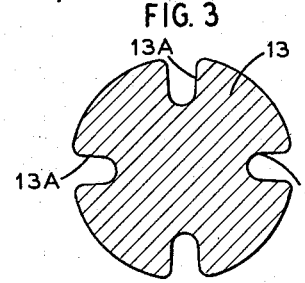
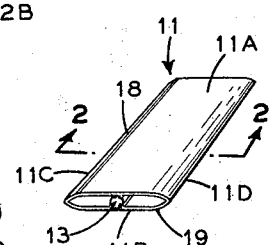
INVENTOR.
Elliot Kahn
Alex Bobrowich
BY
ATTORNEY

United States Patent Office 3,312,242
Patented Apr. 4, 1967

3,312,242
DAMPER CONSTRUCTION
Elliot Kahn, New Rochelle, and Alex Bobrowich, Bronx, N.Y., assignors to Arrow Louver and Damper Corp., Brooklyn, N.Y., a corporation of New York
Filed June 11, 1964, Ser. No. 374,459
4 Claims. (Cl. 137—601)

This invention relates to an air or gas flow control means such as a louver or damper, and more particularly to a novel louver or damper constructed as integrally formed air foil section.

Heretofore, louver or damper constructions for use in controlling air or gas flow in a given fluid flow system were generally formed of several component parts which were separately fabricated and then subsequently assembled and secured together by suitable fastening means, such as rivets. The disadvantage of dampers constructed of component parts is that they are relatively costly to produce and to assemble in that a number of different dies, molds, and/or machinery or other operations are required to fabricate the same. The cost is further enhanced by the relatively large amount of labor required to manufacture and assemble the component parts thereof. Also, it has been noted that such fabricated dampers lack the necessary strength and rigidity to resist high static pressures in certain fluid flow systems. It has also been noted that the known dampers fabricated from a series of component parts did not present a construction with a smooth outer surface free of interruption which produced a minimum of resistance to the air or gas flow thereover. Thus, the known fabricated dampers produced a considerable resistance to the flow of fluid flowing thereover resulting in a considerable loss in the overall efficiency of the fluid flow system in which such fabricated dampers were utilized.

It is therefore an object of this invention to provide an improved integrally formed damper construction in a desired air flow shape which will prevent a smooth surface free of any interruption to the gas flow thereover.

Another object of this invention is to provide an improved louver or damper of sufficient strength and rigidity to withstand the high static pressures of given fluid flow systems.

Another object of this invention is to provide a novel integrally formed louver or damper construction in which the damper is rendered readily made to any desired length.

It is another object of this invention to provide an improved louver or damper construction in which the production and manufacturing thereof is substantially simplified.

Another object of this invention is to provide an improved louver or damper construction which is relatively simple in construction, relatively inexpensive to fabricate, and which is positive in operation.

A feature of this invention resides in the provision that the louver of the instant invention can be readily extruded as integrally formed air foil section and which can be readily cut to any desired length necessary for any given application.

Other features and advantages of this invention will become more readily apparent when considered in view of the drawings in which:

FIGURE 1 is a perspective view of a damper construction of the instant invention.

FIGURE 2 is an enlarged detail sectional view taken along line 2—2 of FIG. 1.

FIGURE 3 is an enlarged detail sectional view taken through the shaft upon which the damper is mounted.

FIGURE 4 is a front elevation of a louver assembly embodying the louver or damper construction of the instant invention.

FIGURE 5 is an end elevation view of FIG. 4.

Referring to the drawings, there is shown in FIGS. 4 and 5, a louver or damper assembly or unit 10. The unit 10 illustrated includes a plurality of the novel dampers 11 of the instant invention mounted in a substantially rectangular frame 12 defined by a top 12A, bottom 12B and connected side members 12C formed of suitable structural material having either a channel and/or angle cross-section. The dampers 11 are suitably supported between the side members 12C of the frame 12 to oscillate about the longitudinal axis of the respective dampers. As will be hereinafter more fully described, the axis about which the respective dampers 11 pivot is defined by a shaft 13 which extends longitudinally therethrough. The ends of the respective damper shafts 13 are rotatably supported in suitable bushing or bearings 14 which are uniformally spaced in the opposed side frame members 12C. As shown, one of the shafts 13 may have connected thereto a crank 15 which may be connected for either manual or power operation, and a conventional louver or damper linkage 16 may be used to interconnect the respective dampers 11 for unitary operation, when the crank 15 is operated to move the dampers between open and closed positions.

As best seen in FIGS. 1 and 2, the respective dampers 11 are preferably formed by extrusion in a shape of a flattened tubular member having the form of an air foil section. The material of the extruded air foil section may be aluminum, aluminum alloy or any other suitable light weight having a high strength characteristic.

As shown in FIG. 1, the respective dampers 11 comprises a predetermined length of extruded tubular aluminum material which can be readily cut to size from an elongated length of extruded stock material. It is contemplated that by stocking extruded lengths of tubular constructions of varying widths, that any size damper can be readily formed simply by cutting from such stock material, the length required from the prescribed width stock.

As shown in FIG. 1, the air foil section is extruded so as to define a flattened tubular member having an upper and lower portion 11A, 11B, each having its respective outer surface smooth and free of any interruptions. Accordingly, the edges 11C, 11D of the upper and lower portions 11A, 11B of the extruded air section are defined as integrally formed sharply curved bights which define the opposed longitudinal edges of the foil.

As best seen in FIG. 2, the upper and lower portions 11A, 11B of the air foil section 11 are equidistantly spaced from a medial plane or chord line 17 of the air foil section. Thus, it is to be noted that the respective upper and lower portions or surfaces 11A, 11B of the air foil are symetrically formed about a medial plane 17 thereof.

In accordance with this invention, the upper surface or portion 11A adjacent one edge portion 11C of the foil 11 is provided with a dove tail slot or groove 18 that extends longitudinally the length of the air foil section of damper blade 11. Likewise, the lower surface or portion 11B adjacent the opposite edge portion 11D of the air foil is provided with a similarly constructed dove tail slot 19. A strip 20 of suitable flexible material having a dove tail head 20A is fitted into the slots 18 and 19 to form therealong the sealing strip. The sealing strip 20 may be formed of any suitable, flexible strip of material such as natural or synthetic rubber, plastic and the like. The strips 20 thus disposed in each of the grooves 18 and 19 forms a tight seal between adjacent damper blades 11 when the damper assembly 10 is closed.

A similar sealing strip 21 may be also fitted into an appropriate slot formed in the top and bottom frame members 12A, 12B to engage the marginal portions of the upper and lower dampers when the assembly is closed, thus forming a tight seal therebetween. Sealing strips 22 may also be provided in suitable slots formed in the side frame members 12C to form a seat at the ends of the respective dampers in the closed position thereof.

As seen in FIG. 2, the upper and lower portions 11A, 11B of the air foil section has integrally formed on the inner surface thereof a pair of longitudinally extending ribs 23, 24 respectively that project inwardly into the interior of the foil section. As shown, it is preferred that the pairs of ribs 23, 24 connected to the respective upper and lower portions of the air foil defined therebetween an angle of substantially 90°. Also, the free edges of the ribs 23, 24 are preferably rounded as indicated. Between the adjacent ribs 23, 24 there is an arcuate fillet 23A, 24A or bearing surface having its radius centered at the intersection of the projected lines of the respective ribs 23, 24 and tangent to the inner surface of portions 11A, 11B.

Referring to FIG. 2, the shaft 13 is cut to length from a generally circular or tubular stock member, preferably extruded from the same material as that of the damper. Accordingly, the shaft 13 has a radius just slightly less than that of the bearing surface 23A, 24A, and it is formed with a plurality of radially extending slots 13A which are angularly spaced to receive the ribs 23, 24 of the respective air foil portions 11A, 11B. The depth of the respective slots 13A is substantially equal to the width or height of the ribs 23, 24. With the construction described, the shaft 13 may be suitably positioned or secured to the foil section simply by aligning the slots 13A of the shaft 13 with the ribs 23, 24 of the foil section and sliding the shaft 13 into position therebetween. Thus, as seen in FIG. 2, the damper 11 is suitably connected to the shaft 13 so that the damper 11 can pivot about the axis defined by the shaft 13.

The frame members 12A, 12B and 12C are all cut from suitable structural sections, preferably formed of extruded aluminum or other suitable light weight high strength material.

From the foregoing description, it will be readily apparent that the louver construction described is integrally formed as a single extruded component part, and therefore, presents a strength and rigidity capable of resisting the high static pressure in a given fluid flow system in which such dampers are used. Also, the construction is such that the extruded form defines an air foil section having a smooth, uninterrupted outer surface to the fluid flow thereover, and thereby offers a minimum of resistance to the flow of fluid passing thereover. Further, the extruded damper construction forms an integral component member substantially reduces the cost of handling and fabricating the same as compared to that of the known damper constructions.

While the instant invention has been described with reference to a particular embodiment thereof, it will be understood and appreciated that variations and modifications may be made without departing from the spirit or scope of the invention.

What is claimed is:
1. a louver or damper blade comprising,
  (a) an integrally constructed hollow air foil section including similarly constructed upper and lower surface defining portions,
  (b) each of said surface defining portions having their respective longitudinally extending edge portions converging to define an integrally formed bight portion that defines the opposed longitudinal edges of said air foil section,
  (c) said upper and lower surface defining portions being similarly disposed with respect to the chord line of said foil section,
  (d) a shaft extending longitudinally of said foil section to define the axis about which said damper blade pivots,
  (e) and means for connecting said air foil section to said shaft, said latter means comprising a longitudinally extending rib projecting into the interior of said foil section, said rib being substantially co-extensive with the length of said foil section, and said shaft having a complementary groove formed therein for receiving said rib to key said foil section to said shaft.
2. A louver or damper comprising,
  (a) an elongated flattened hollow integrally formed tubular structure opened at the opposed ends thereof,
  (b) said flattened tubular structure defining an integrally formed air foil section having similarly shaped upper and lower surface forming portions, whereby corresponding points spaced along the respective upper and lower surface forming portions are equidistantly spaced from a chord line extending between the longitudinal edges of said foil,
  (c) means defining a longitudinally extending groove formed in each of the upper and lower surface forming portions adjacent the respective longitudinal edge of said foil,
  (d) a sealing strip of flexible material fitted into each of said grooves,
  (e) said sealing strip projecting outwardly from the respective surfaces of said foil to define a seal in the closed position of said damper,
  (f) a shaft substantially co-extensive of said damper and extending longitudinally thereof between the upper and lower surfaces thereof,
  (g) and means for securing said damper to said shaft,
  (h) said latter means including a longitudinally extending rib integrally formed along the inner surface of said air foil section to project inwardly thereof whereby said rib reinforces said section longitudinally thereof, and
  (i) said shaft having a complementary groove extending longitudinally thereof to receive said rib whereby said air foil section is keyed to said shaft.
3. A louver or damper blade comprising,
  (a) an elongated flattened tubular structure opened at the opposed ends thereof,
  (b) said flattened tubular structure defining an integrally formed air foil section having similarly shaped upper and lower surface forming portions whereby corresponding points spaced along the respective upper and lower surface forming portions are equidistantly spaced from a chord line extending between the longitudinal edges of said foil,
  (c) means defining a longitudinally extending dove tail groove formed in the upper surface forming portion adjacent one edge portion of said section and a dove tail groove formed in the lower surface portion thereof adjacent the other longitudinal edge portion thereof,
  (d) a sealing strip of flexible material having a dove tail head adapted to be received in each of said grooves,
  (e) said sealing strip having a flexible portion projecting outwardly from the respective top and bottom surfaces of said foil section,
  (f) a shaft substantially co-extensive of said air foil section and extending longitudinally thereof between the upper and lower surfaces thereof,
  (g) and means for securing said foil section to said shaft,
  (h) said latter means including radially inwardly projecting ribs formed integrally with said upper and lower surface portions of said foil section, said rib reinforcing said air foil section longitudinally thereof, and cooperating grooves formed in said shaft to receive the same whereby said foil section is keyed to said shaft.

4. An integrally formed unitary damper blade comprising,
(a) an extruded substantially flattened tubular member with full open ends defining an air foil section having upper and lower surface forming portions,
(b) the external surfaces of said upper and lower surface forming portions being smooth and free of any interruption,
(c) said air foil section being defined with integrally formed sharply curved bight edge portions extending along the opposed longitudinal edges of said foil section,
(d) said upper and lower surface defining portion being equidistantly spaced to either side of a medial plane of said foil section,
(e) said upper and lower surface portions each having formed therein adjacent one edge portion thereof a longitudinally extending dove tail groove disposed adjacent and parallel to said one edge portion thereof,
(f) a strip of flexible sealing material disposed in each of said grooves,
(g) a shaft sized to length of said foil section extending longitudinally thereof,
(h) said shaft being extended substantially along the central longitudinal axis of said foil section,
(i) said shaft defining the axis about which said foil section can pivot,
(j) and means for securing said foil section to said shaft,
(k) said latter means including an integrally formed rib connected to the inner surface of the respective upper and lower portions, said ribs extending inwardly therefrom to define an angle therebetween, said ribs being integrally formed of the same material forming said air foil section, said ribs reinforcing said air foil section longitudinally thereof,
(l) and said shaft being formed with complementary grooves for receiving said ribs whereby said foil section is fixedly keyed to said shaft.

References Cited by the Examiner
UNITED STATES PATENTS

| | | | |
|---|---|---|---|
| 1,872,599 | 8/1932 | Le Grand | 251—305 XR |
| 1,917,000 | 7/1933 | Tyden | 251—359 XR |
| 2,699,106 | 1/1955 | Hoyer | 137—609 XR |
| 2,836,191 | 5/1958 | Wallin et al. | 137—609 XR |
| 2,946,554 | 7/1960 | Asker et al. | 251—306 |
| 3,026,083 | 3/1962 | McLaren et al. | 251—306 XR |
| 3,062,232 | 11/1962 | McGay | 251—298 XR |
| 3,084,715 | 4/1963 | Scharres | 251—306 XR |

FOREIGN PATENTS

| | | |
|---|---|---|
| 215,078 | 4/1924 | Great Britain. |
| 656,748 | 2/1938 | Germany. |

ALAN COHAN, *Primary Examiner.*

M. CARY NELSON, S. SCOTT, *Assistant Examiners.*